United States Patent [19]
Pichotta

[11] Patent Number: 5,799,869
[45] Date of Patent: Sep. 1, 1998

[54] OFF-ROAD HEATING CONTROL

[75] Inventor: Andrew J. Pichotta, Minneapolis, Minn.

[73] Assignee: Eagle Engineering and Manufacturing, Inc., Welcome, Minn.

[21] Appl. No.: 561,489

[22] Filed: Nov. 20, 1995

Related U.S. Application Data

[62] Division of Ser. No. 73,887, Jun. 9, 1993, Pat. No. 5,490,556.

[51] Int. Cl.$^6$ ............................................. F24D 3/00
[52] U.S. Cl. ............... 237/8 A; 237/12.3 B; 236/78 D; 364/162; 165/269
[58] Field of Search ............... 236/78 D; 165/30, 165/269; 364/162; 237/8 A, 12.3 B

[56] References Cited

U.S. PATENT DOCUMENTS

| | | | |
|---|---|---|---|
| 3,938,017 | 2/1976 | Hayes | 236/78 D |
| 4,262,737 | 4/1981 | Faillace | 165/30 |
| 4,325,426 | 4/1982 | Otsuka et al. | 236/78 D |
| 4,485,863 | 12/1984 | Yoshida et al. | 165/42 |
| 5,270,916 | 12/1993 | Sexton et al. | 364/161 |

FOREIGN PATENT DOCUMENTS

| | | | |
|---|---|---|---|
| 0425454 | 5/1991 | European Pat. Off. | 236/78 D |

OTHER PUBLICATIONS

Kuo, B.C. *Discrete-Data Control Systems* Prentice Hall Inc. pp. 336-351. (No Date).
Shrakar, Mini & Microcumputer Control in Industrial Processes 1980 Tp 155.75 M53 (Copy in 236/78 d) pp. 82-83.
Fishbeck, Writing PID Control Loops Easily in Basic Control Engineering vol. 25 No. 10 pp. 45-47 Oct. 1978.

*Primary Examiner*—John K. Ford
*Attorney, Agent, or Firm*—Faegre & Benson

[57] ABSTRACT

Apparatus for heating and cooling an enclosed operator space in an off-road vehicle controlling evaporator fan speed, compressor clutch and condenser fan operation, and having sensors for detecting operator space temperature and an evaporator freezing condition, the condenser fan motor fuse condition, and under or over pressure conditions in the compressor; the apparatus also controls the operation of a heat source such as a heat valve in a coolant path or an electric resistance heater. The evaporator fan speed is controlled by pulse-width modulating power to the fan motor and speed is displayed by a bar graph; a digital display of temperature and system diagnostics is also provided. Operation of the clutch is inhibited when the evaporator freezes. The apparatus includes an electronic temperature control circuit which has a first, narrow deadband within which actual temperature variations are ignored, and a second, wider deadband within which temperature variations must exist for a preset period of time before the apparatus will shift between COOL and HEAT modes.

6 Claims, 12 Drawing Sheets

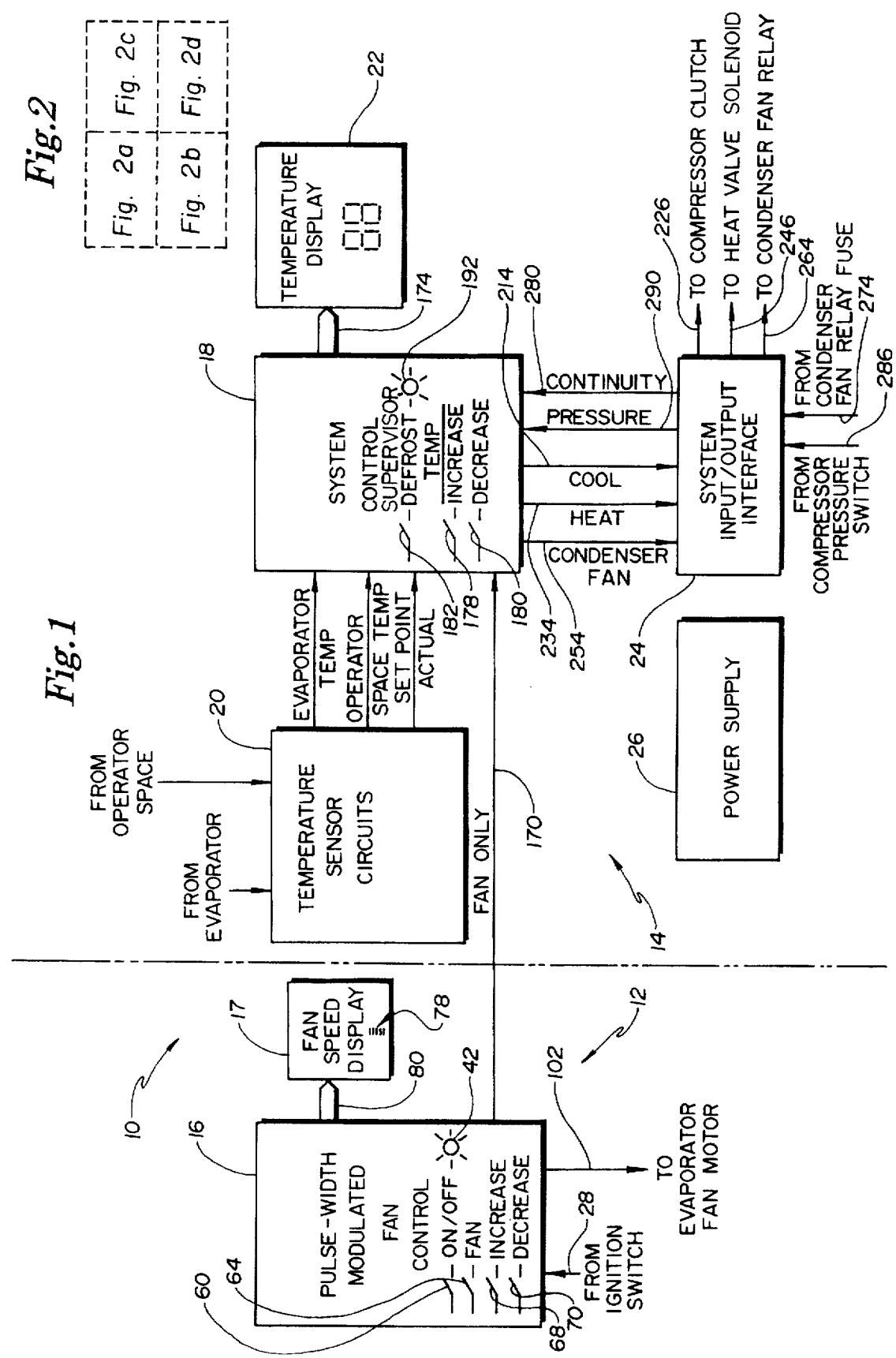

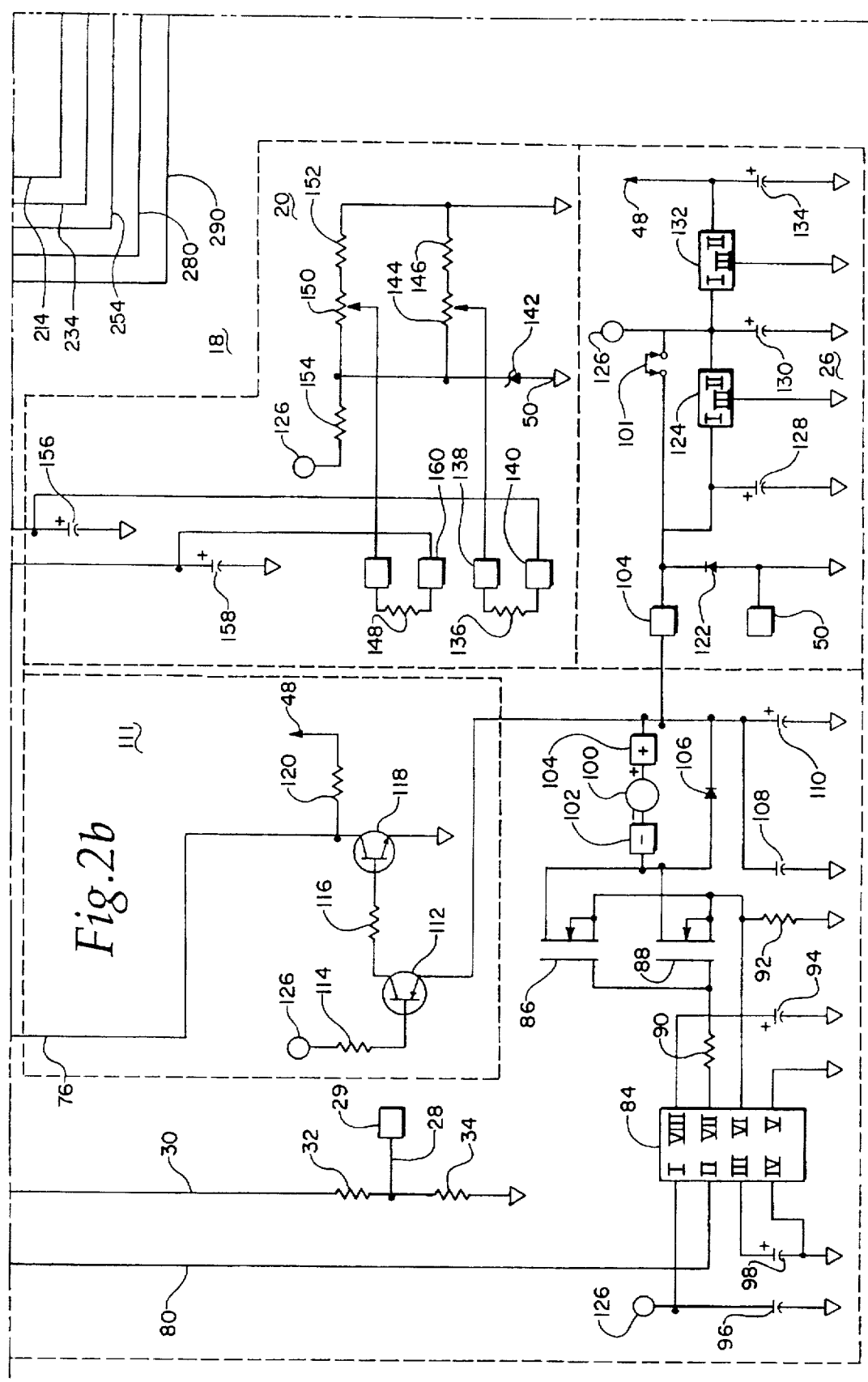

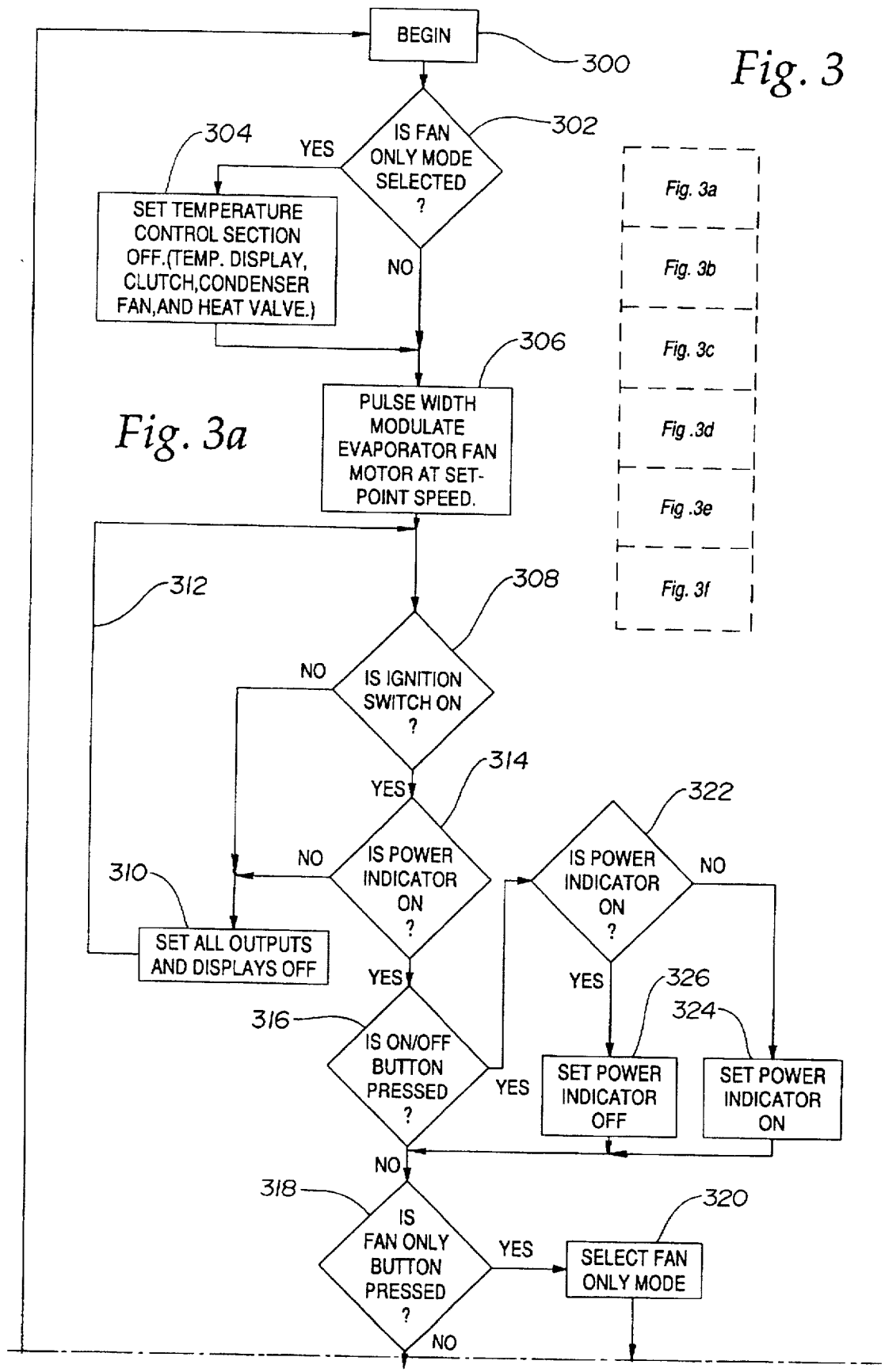

OFF-ROAD HEATING CONTROL

This is a division of application Ser. No. 08/073,887, filed Jun. 9, 1993, U.S. Pat. No. 5,490,556.

BACKGROUND OF THE INVENTION

This invention relates to the field of air conditioning equipment, more particularly to climate control for an operator space in off-road vehicles.

BRIEF DESCRIPTION OF THE DRAWINGS

FIG. 1 is a block diagram of the system of the present invention.

FIG. 2 is a key for FIGS. 2a, 2b, 2c and 2d.

FIGS. 2a, 2b, 2c, and 2d together make up a detailed schematic of a circuit useful in the practice of the present invention.

FIG. 3 is a key for FIGS. 3a, 3b, 3c, 3d, 3e, and 3f.

FIGS. 3a–3f together make up a flow chart of the operation of the present invention.

DETAILED DESCRIPTION

Figure 2A:
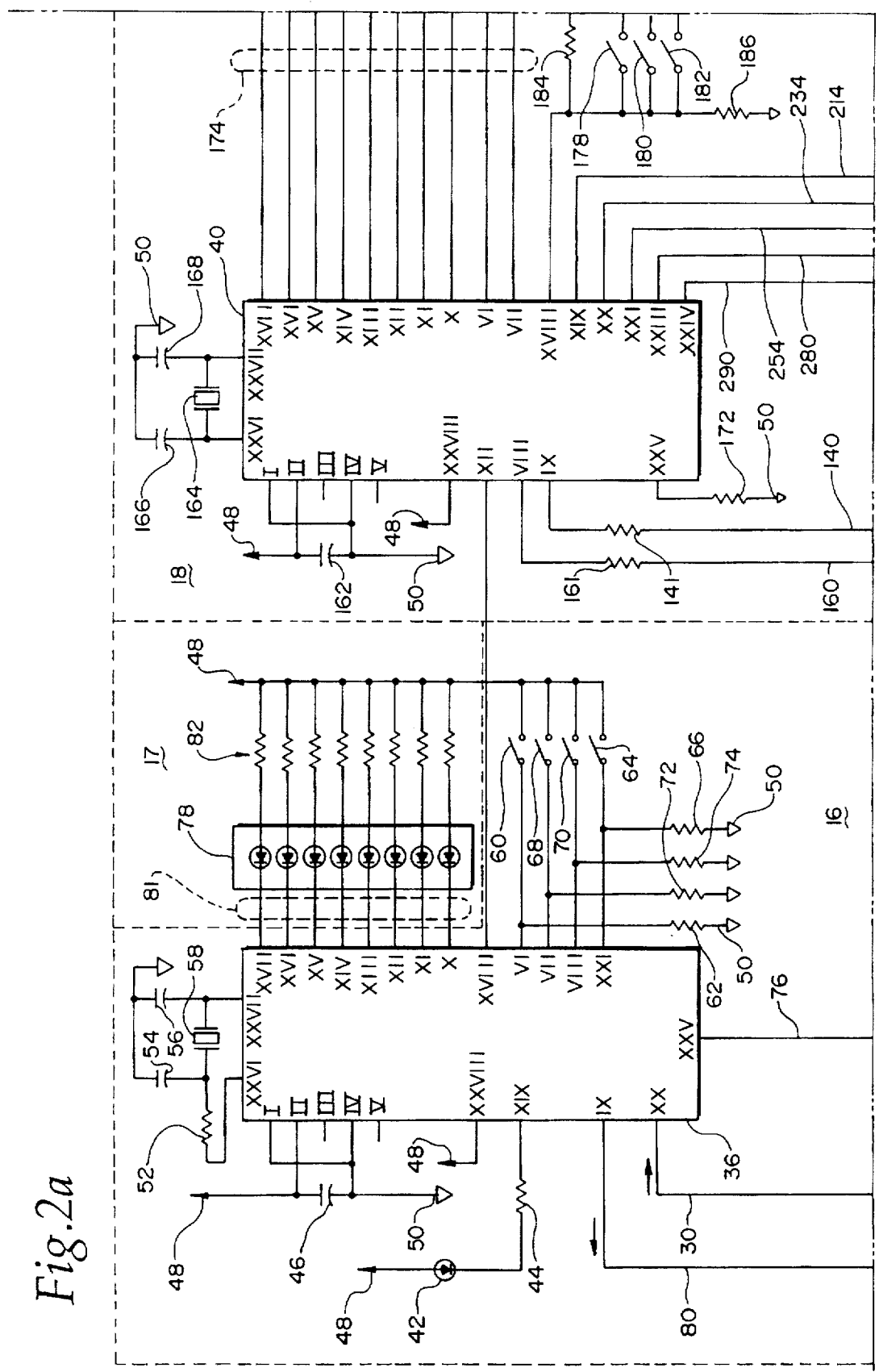

Referring now most particularly to FIG. 1, a block diagram of the climate control system 10 of the present invention may be seen. System 10 preferably includes an evaporator fan speed control subsystem 12 and an overall system control 14. Subsystem 12 includes a pulse-width modulated fan control 16 and a fan speed display 17. System control 14 preferably includes a system control supervisor 18, temperature sensor circuits 20, a temperature display 22 and a system input/output interface circuit 24. A power supply 26 is also provided to produce the regulated voltage levels suitable for operation of the various integrated circuits of control system 10. Even though not shown on FIG. 1, it is to be understood that power supply 26 provides the various appropriate voltage levels of power to the remaining parts of system 10.

Turning now also to FIGS. 2a and 2b, the evaporator fan speed control subsystem 12 is as follows:

The pulse-width modulated fan control circuit 16 receives an input on line 28 from the vehicle or operator ignition switch (not shown) via a terminal 29. When voltage is present on line 28, a 100K ohm resistor 32 will act as a current limiting resistor; and when voltage is absent, a 10K ohm resistor 34 will act as a pull-down resistor for line 30 which is connected to a type 16C55XT/P microprocessor 36 available from Microchip Technology, Inc. at 2355 West Chandler Boulevard, Chandler, Ariz. 85224.

It is to be understood that the pin designations for integrated circuits (or IC's) are indicated by Roman numerals. The signal on line 30 tells microprocessor 36 whether or not the operator ignition switch is on or off. A visible light emitting diode 42 is illuminated via a 220 ohm resistor 44 to indicate when system 10 is "ON".

Microprocessor or integrated circuit 36 further has a 0.1 uf capacitor 46 connected between $V_{DD}$ 48 (which is preferably at 5 volts and is connected to pin II of IC 36) and circuit common 50 (which is connected to pin IV of IC 36). IC 36 also preferably includes a clock circuit made up of a 22 ohm resistor 52, a pair of 20 pf capacitors 54, 56 and a 4 MHz crystal 58. An ON/OFF switch 60 is connected between $V_{DD}$ 48 and pin VI of IC 36 with a 10K pull-down resistor 62 to circuit common 50. Similarly, IC 36 receives an input on pin XXI from a FAN switch 64 having a 10K pull-down resistor 66. Switch 64 is provided to select a FAN ONLY mode of operation when desired. A pair of switches 68, 70 provide for INCREASE and DECREASE of fan speed respectively, with each having its respective 10K pull down resistors 72, 74; switches 68 and 70 are respectively sensed by pins VII and VIII of IC 36. In one embodiment, IC 36 receives a VOLTAGE SENSE input at pin XXV from line 76 and provides a pulse-width modulation signal output from pin IX on line 80.

Fan speed display circuit 17 is made up of an eight segment bar graph indicator 78 to indicate the percent of fan speed selected for the evaporator fan motor 100. Indicator 78 is driven via a group of driver lines 81. Each bar in the indicator 78 is preferably made up of an LED and is connected to $V_{DD}$ 48 via respective individual 220 ohm resistors 82.

Referring now most particularly to FIG. 2b, the pulse-width modulation command line 80 is connected to a type IR2121 driver integrated circuit 84 available from International Rectifier. IC or chip 84 is capable of driving a pair of power FET transistors 86, 88 which are preferably each a type 2SK1387 available from Fuji Electric or a type MTA30NO6E available from Motorola. The FET's are driven from pin VII of IC 84 through a 33 ohm resistor 90. IC 84 also senses FET current at pin VI which is connected with a 0.005 ohm current sensing resistor 92 to FETS 86, 88. A 10 uf capacitor 94, a 0.1 uf capacitor 96 and a 0.001 uf capacitor 98 are also connected to chip 84 for noise suppression and stability. Evaporator fan motor 100 is connected between an output terminal 102 and the vehicle battery power $V_{BB}$ 104. It is to be understood that vehicle battery power for off-road vehicles may be either 12 or 24 volts, and that system 10 is suitable for use with either voltage by inserting a jumper 101 for 12 volts and removing it for 24 volts. A back diode 106 (preferably a type C62M available from Fuji Electric) is connected across terminals 102, 104 and a 0.1 uf capacitor 108 and a 1,000 uf capacitor 110 are connected to terminal 104 for noise suppression.

If desired, a voltage sensing circuit 111 may be used to automatically check to see if a 12 or 24 volt vehicle battery is being used to power system 10. When circuit 111 is used, microprocessor 40 determines the level of vehicle battery voltage on line 104. The voltage sensing circuit 111 is made up of a MPS8598 transistor 112 available from Motorola, a 2.2K ohm resistor 114, a 4.7K ohm resistor 116, a 2N4400 type transistor 118, and a 10K resistor 120. It is to be understood that circuit 111 may be omitted, in which case pin XXV of IC 36 is left unconnected.

Power supply subsystem 26 receives power from the vehicle battery at terminal 104 and has a voltage reversal input diode 122 which is preferably a type D6015L available from Teccor Semiconductors, Inc. at P.O.Box 619009, Dallas, Tex. 75261. A type 7812 integrated circuit voltage regulator 124 available from a number of manufacturers, including Motorola provides a 12 volt output $V_{CC}$ at terminal 126 when a 24 volt battery system is used. A 100 uf capacitor 128 may be used to provide input filtering (or it may be omitted, if found to be unnecessary) and a 10 uf capacitor 130 may be used to provide output filtering. A second integrated circuit regulator 132, preferably a type 7805 (available from the same manufacturer) provides the 5 volt output $V_{DD}$ on terminal 48. A 10 uf capacitor 134 provides output filtering for regulator 132.

Referring now to the temperature sensor circuits 20, a temperature sensitive resistor or thermistor 136 having a nominal value of 10K ohms at 25° C. and available from Panasonic as part number ERTD2FHL103S is connected across terminals 138 and 140. Resistor 136 is positioned in the operator space in which the temperature is to be regulated by climate control system 10. A 1N825 type 6.2 volt zener diode 142 provides a regulated voltage level supply which may be trimmed by a 1K ohm potentiometer 144 connected in series with a 2.2K resistor 146 to supply electrical power to temperature sensitive resistor 136. Similarly, another temperature sensitive resistor or thermistor 148 of the same type as thermistor 136 is connected to a 1K pot 150 and a 2.2K resistor 152 supplied from a 1K resistor 154 connected to the $V_{CC}$ supply 126. It is to be understood that thermistor 148 is located in contact with the evaporator heat exchanger and is used to determine if the evaporator is frozen or not. Each of thermistors 136, 148 is connected respectively to a 0.22 uf capacitor 156, 158 and the nodes between the respective thermistors and capacitors are connected via lines 140, 160, respectively, to pins IX and VIII of integrated circuit 40 through respective 150 ohm resistors 141, 161. It is to be understood that each of resistors 136, 148 has a unidirectional temperature coefficient. IC 40 is also preferably a type 16C57XT/P integrated circuit microprocessor. IC 40 also preferably has a 0.1 uf capacitor 162 connected between the 5 volt $V_{DD}$ supply 48 and circuit common 50 adjacent IC 40 for noise suppression. IC 40 also has its own clock circuit made up of a 4 MHz crystal 164 and a pair of 20 pf capacitors 166, 168. A line 170 is connected from pin XVIII of IC 36 to pin XII of IC 40 and provides a FAN ONLY signal from IC 36 to IC 40 when that function or mode is desired and selected by switch 64. In one embodiment, a 10K resistor 172 is normally connected to circuit common 50, grounding pin XXV of IC 40 to provide a SETPOINT output on lines 174 to Temperature Display circuit 22. Alternatively, (in that embodiment) resistor 172 may be removed to provide an ACTUAL temperature signal on lines 174. In an alternative embodiment, the display may be switched between SETPOINT and ACTUAL air temperature via key depressions which will be described in more detail infra. A pair of switches 178, 180 provide for temperature increase and decrease adjustments, and a third switch 182 provides for selection of a DEFROST mode of operation. Switches 178, 180 and 182 are all connected to pin XVIII of IC 40. In one embodiment, a 470 ohm resistor 184 and a 10K ohm resistor 186 provide for display in degrees Fahrenheit. In that embodiment, if degrees Centigrade are desired to be displayed, resistor 184 is to be removed. It is to be understood, however, that switching between Fahrenheit and Centigrade degrees may be accomplished (in an alternative embodiment) by sensing multiple switch depressions, as described in more detail infra. It is to be understood that switches 60, 64, 68, 70, 178, 180, and 182 are all preferably normally open, momentary contact switch types.

Figure 2C:
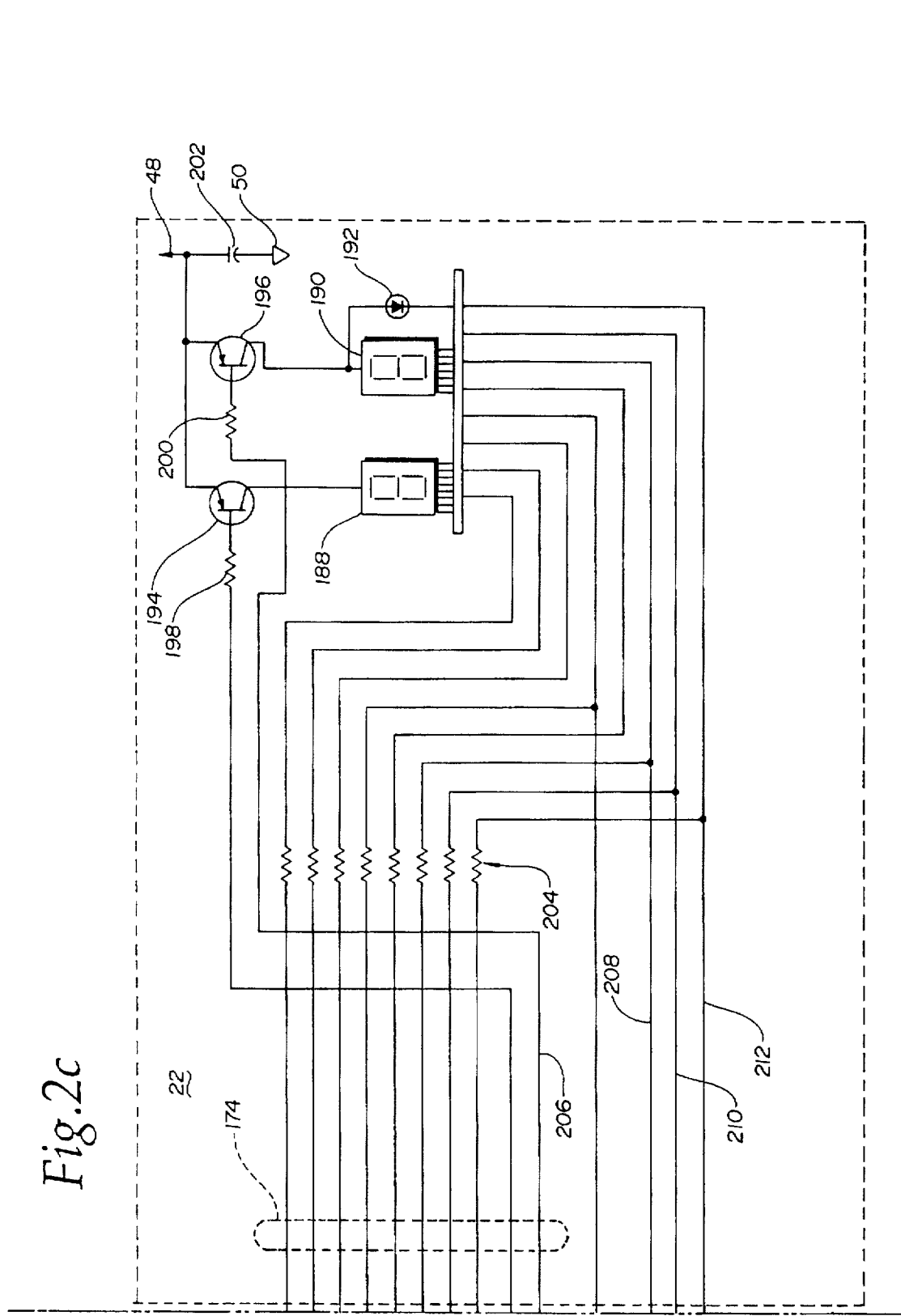

Referring now most particularly also to FIG. 2c, details to the temperature display subcircuit 22 may be seen. Circuit 22 preferably includes a pair of seven-segment displays 188, 190 preferably type HDSP5621 manufactured by Hewlett-Packard. A DEFROST mode indicator 192 in the form of a visible light emitting diode is also utilized. Displays 188, 190 and indicator 192 are driven from microprocessor 40 in a multiplexed fashion via lines 174 to provide a two-digit decimal display of temperature. A pair of MPS 8598 transistors 194, 196 together with a pair of 150 ohm resistors 198, 200, along with a 10 uf capacitor 202 provide drive circuitry to indicators 188, 190. Eight 33 ohm resistors 204 are provided in series with the segment drive lines for displays 188, 190, while transistors 194 and 196 provide a digit select function as is well known in the art.

Figure 2D:
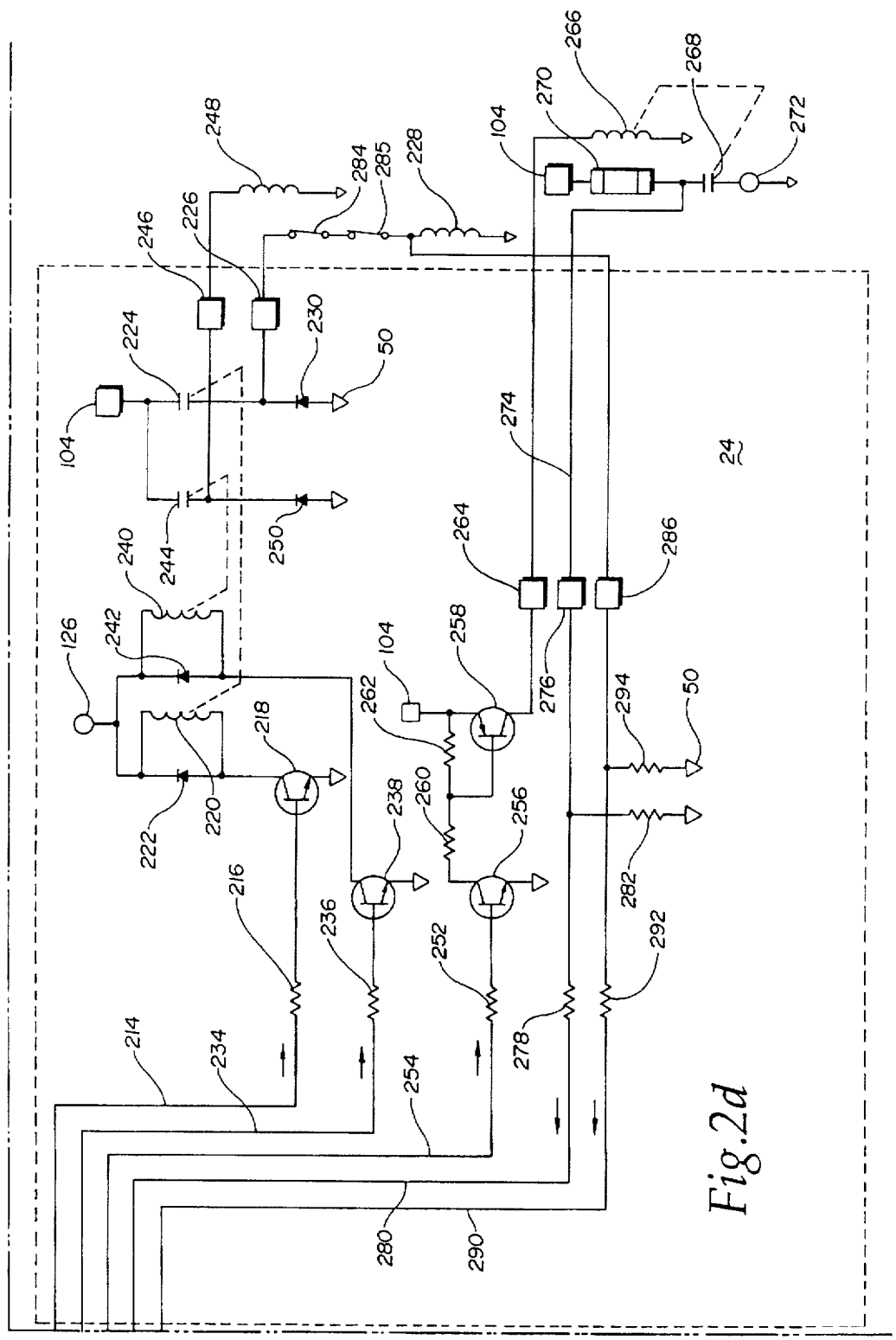

Referring now also to FIG. 2d, details of the system input/output interface circuit 24 may be seen. Line 214 provides a "COOL" command from microprocessor 40 via a 1K resistor 216 to a type 2N4400 transistor 218 to actuate a relay coil 220 having a back diode 222 across it. Coil 222 is connected to the 12 volt supply 126 and actuates a contact 224 connected to a clutch output terminal 226. Output terminal 226 provides power to a clutch coil 228 which has a back diode 230 across it. Clutch coil 228 energizes a clutch to power a vehicle refrigerant compressor to provide cooling for the operator space to be cooled by system 10. It is to be understood that the clutch is connected between a prime mover such as an internal combustion engine, a hydraulic motor, or an electric motor and the refrigerant compressor.

Line 234 from microprocessor 40 provides a "HEAT" signal via a 1K resistor 236 to a 2N4400 type transistor 238 which powers a relay coil 240 having a back diode 242 across it. Relay coil 240 has a contact 244 connected to a heat valve output terminal 246. Relay 240 is preferably a type JR1-DC12C manufactured by Aromat. Heat valve output terminal 246 is connected to a coil 248 of a solenoid-operated heat valve of the type manufactured by Kip Inc. at 72 Spring Lane, Farmington, Conn., 06032 under part number 651118. Coil 248 preferably has a back diode 250 across it.

A condenser fan line 254 provides a signal via a 2.2K resistor 252 to a 2N4400 type transistor 256 which is connected to a type TIP125 transistor 258 manufactured by Motorola. Transistor 256 powers transistor 258 via a pair of 10K resistors 260, 262. Transistor 258 supplies vehicle power (typically either 12 or 24 volts) from terminal 104 to a condenser fan relay driver output terminal 264. A condenser fan relay coil 266 actuates a contact 268 to provide power from the vehicle battery via terminal 104 through a fuse 270 to a condenser fan motor 272. A line 274 is connected to the BLOWN POWER FUSE terminal 276 which provides a signal via a 100K resistor 278 on line 280 as to whether the condenser fan relay fuse 270 is blown or not. A 10K pull down resistor 282 pulls down line 280 when fuse 270 is open. A pair of Normally-Closed, out-of-limit pressure switches 284, 285 are located in the air conditioning compressor (not shown). Switch 284 will open when an over-pressure condition exists and switch 285 will open when an under-pressure condition exists at the compressor. Pressure sense terminal 286 is connected between switches 284, 285 and compressor clutch coil 228 to provide a signal on line 290 to microprocessor 40 when an over or under pressure condition exists in the compressor. It is to be understood that the signal at terminal 286 is interrogated only when power is delivered to terminal 226, calling for energization of the compressor clutch coil 228. A 100K resistor 292 and a 10K resistor 294 provide buffering for the signal from terminal 286.

An overview of the operation of system 10 with respect to the block diagram of FIG. 1 and the schematic of FIG. 2a–2d is as follows:

Referring first to subsystem 12, the evaporator fan speed control 12 operates under the supervision of microprocessor 36 to provide incremental speed adjustability of the evaporator fan providing air to the operator space in which the temperature is to be controlled by system 10. Microprocessor 36 accepts inputs from the speed setting switches 68, 70 to set the fan speed in increments of 10 percent between 30 and 100 percent, indicated by the bar graph display 78.

Evaporator fan motor 100 is operated under pulse-width modulation control at approximately 6.25 KHz to prevent the current in motor 100 from going into a current limit mode as controlled by IC 84. Operating in such a high frequency mode provides that the current in motor 100 is inductance limited resulting in a triangular waveform having a generally linear "ramp up" characteristic when FETs 86, 88 are ON, and a generally linear "ramp down" characteristic when the FETs 86, 88 are OFF. If a lower frequency, for example having a period of one millisecond, were to be selected, the current in motor 100 would ramp up to, for example, a current limit value of 20 amps, at which time the current limit function of IC 84 would sense the current limit level on pin VI because of the drop across resistor 92 and shut down FETs 86, 88 in a current limit mode.

Input 28 from the ignition switch of the vehicle senses whether the operator has energized the vehicle ignition system and permits the visible displays to be operable when the ignition system of the vehicle is actuated, and turns off the visible displays and the system outputs when the ignition system is turned off.

It is to be understood, however, that the power to IC 36 remains on because of power supply 26 for as long as the vehicle battery power remains. This permits retention of the last selected speed level for the evaporator fan when the ignition system is re-energized. Similarly, system 10 will "remember" or retain the last selected mode and desired temperature.

Turning now to the system control portion 14, one temperature sensor is provided at the evaporator coil and another is located at the air inlet in the operator space. The evaporator temperature is sensed by thermistor 148 to determine whether the evaporator coil is "icing-up" by checking for a "freeze point" condition at the evaporator. If freezing is detected, the compressor operation is inhibited to avoid further "icing-up" the evaporator coil.

The operator space air temperature is monitored and fed back by thermistor 136 and compared with the desired temperature input set with switches 178, 180 and displayed on display 22. If the actual operator space temperature is above the set point, the microprocessor 40 turns on the compressor clutch 228 by sending a "COOL" command on line 214. Microprocessor 36 will operate fan motor 100 to circulate cooled air into the operator space until the actual temperature matches the set point, at which time the microprocessor 40 will remove the "COOL" command on line 214 disengaging clutch 228 stopping the compressor. If the actual temperature is below the set point, microprocessor 40 will provide a "HEAT" command on line 234 energizing the heat valve solenoid 248.

It is to be understood that the heat valve utilized in this application is preferably a "ON/OFF" type valve and thus may be pulse-width modulated by microprocessor 40 to achieve the desired temperature.

If "FAN ONLY" operation is selected via switch 64, microprocessor 36 commands microprocessor 40 to inhibit both the "COOL" and "HEAT" commands on lines 214 and 234, respectively. If a "DEFROST" operation is selected by switch 182, the defrost indicator 192 is illuminated, and both the "HEAT" and "COOL" commands are provided by microprocessor 40 to actuate both heating via valve 248 and cooling via clutch 228 (for dehumidifying). In the event that there is excessive pressure at the compressor outlet, the HIGH PRESSURE signal line 290 will respond to the changed condition of switch 284, and microprocessor 40 will inhibit further cooling operation.

If fuse 270 opens, line 280 will revert to a logical low level, informing microprocessor 40 that the condenser fan power has been interrupted and cooling operation will again be inhibited.

Calibration of the system is as follows: To calibrate thermistor 136, the system is caused to display actual air temperature (as will be hereinafter described), and the potentiometer 144 is adjusted until the display 22 shows the correct air temperature, as for example measured by a conventional thermometer. To calibrate thermistor 148, the system is caused to display actual evaporator temperature (described infra) and potentiometer 150 is adjusted until display 22 shows either 32° F. or 0° C. while thermistor 148 is held in an ice bath to keep it at a freezing temperature.

Referring now more particularly to the flow chart of FIGS. 3a–3f, a more detailed description of the operation of system 10 is as follows:

Operation starts at BEGIN block 300. A test is performed in block 302 to determine whether FAN ONLY has been selected as the mode of operation for the system 10. This is determined by observing and memorizing or retaining the mode selected by FAN switch 64. Every other time switch 64 is depressed, system 10 is placed in the FAN ONLY mode of operation and the temperature control section is turned off as indicated in block 304. On intervening alternate depressions of switch 64 the system is removed from the FAN ONLY mode and will operate in the HEAT, COOL, or DEFROST mode according to the temperature control status and activation of the DEFROST switch 182.

In an alternative embodiment, once the FAN ONLY mode is entered by the first depression of switch 64, further depressions of switch 64 are ignored, and the FAN ONLY mode is retained until the system 10 is turned off.

Whether or not the system 10 is in the FAN ONLY mode, operation progresses to block 306 where microprocessor 36 operates a conventional pulse-width modulation routine to control the evaporator fan motor 100 at the desired or setpoint speed. Concurrently indicator 78 displays the setpoint speed of motor 100. Next a determination is made as to whether the vehicle ignition switch is on in block 308. If not, all outputs and displays are turned off in block 310 and the system loops via line 312 to monitor the state of the ignition switch. It is to be understood that when the ignition switch is turned on that vehicle voltage (12 or 24 volts) will appear at terminal 29. Once the ignition switch has been turned on, a test is made in block 314 as to whether the power indicator 42 is ON. The system ON/OFF switch 60 is monitored in decision block 316. If the ON/OFF button has been left in the OFF condition (i.e. the last depression of switch 60 cycled the power indicator LED 42 off), interrogation of the FAN button or switch 64 is made in block 318. If the FAN button has been depressed to put system 10 into the FAN ONLY mode of operation, the system is set for the FAN ONLY mode in block 320.

Returning to block 316, on each successive depression of the ON/OFF button, a test is made as to whether the power indicator was left on or off in block 322 and the power indicator is "toggled" to the alternate condition via blocks 324, 326.

Figure 3B:
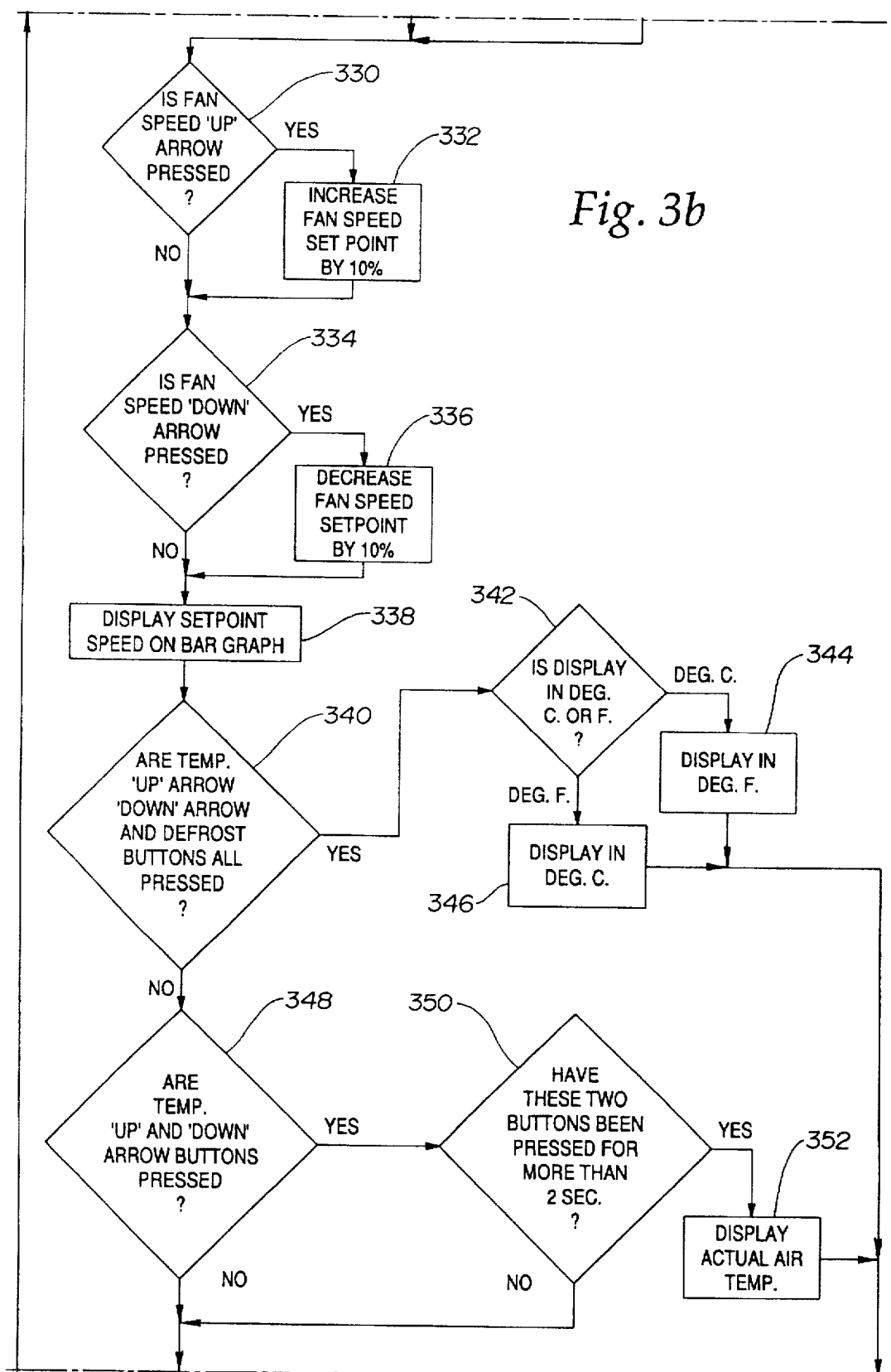

Referring now to FIG. 3b the fan speed INCREASE switch 68 is monitored in block 330 and the fan speed setpoint is increased by 10 percent in block 332 if the switch 68 has been depressed. Similarly, the fan speed DECREASE switch 70 is monitored at block 334 and the evaporator fan speed setpoint is decreased by 10 percent in block 336 if switch 70 has been depressed. The resulting setpoint speed is displayed on the bar graph LED bar 78 as indicated in block 338.

Provision is made to convert the temperature display between the Fahrenheit and Centigrade temperature scales in block 340 by testing whether the temperature INCREASE and DECREASE and the DEFROST buttons are simultaneously depressed. If so, system 10 checks in block 342 to determine the present temperature scale and "toggles" to the other scale in blocks 344 and 346. For example, if the system is displaying Centigrade degrees and the three switches 178, 180, 182 are depressed simultaneously, the system is changed to Fahrenheit degrees via block 344.

Similarly, the system can be converted to display actual air temperature instead of the setpoint or desired temperature by sensing whether switches 178 and 180 have been simultaneously depressed as checked by block 348 and if so whether they have been held depressed for more than two seconds as checked by block 350. If so, the unit is set to display actual air temperature (via display 22) in block 352.

Figure 3C:
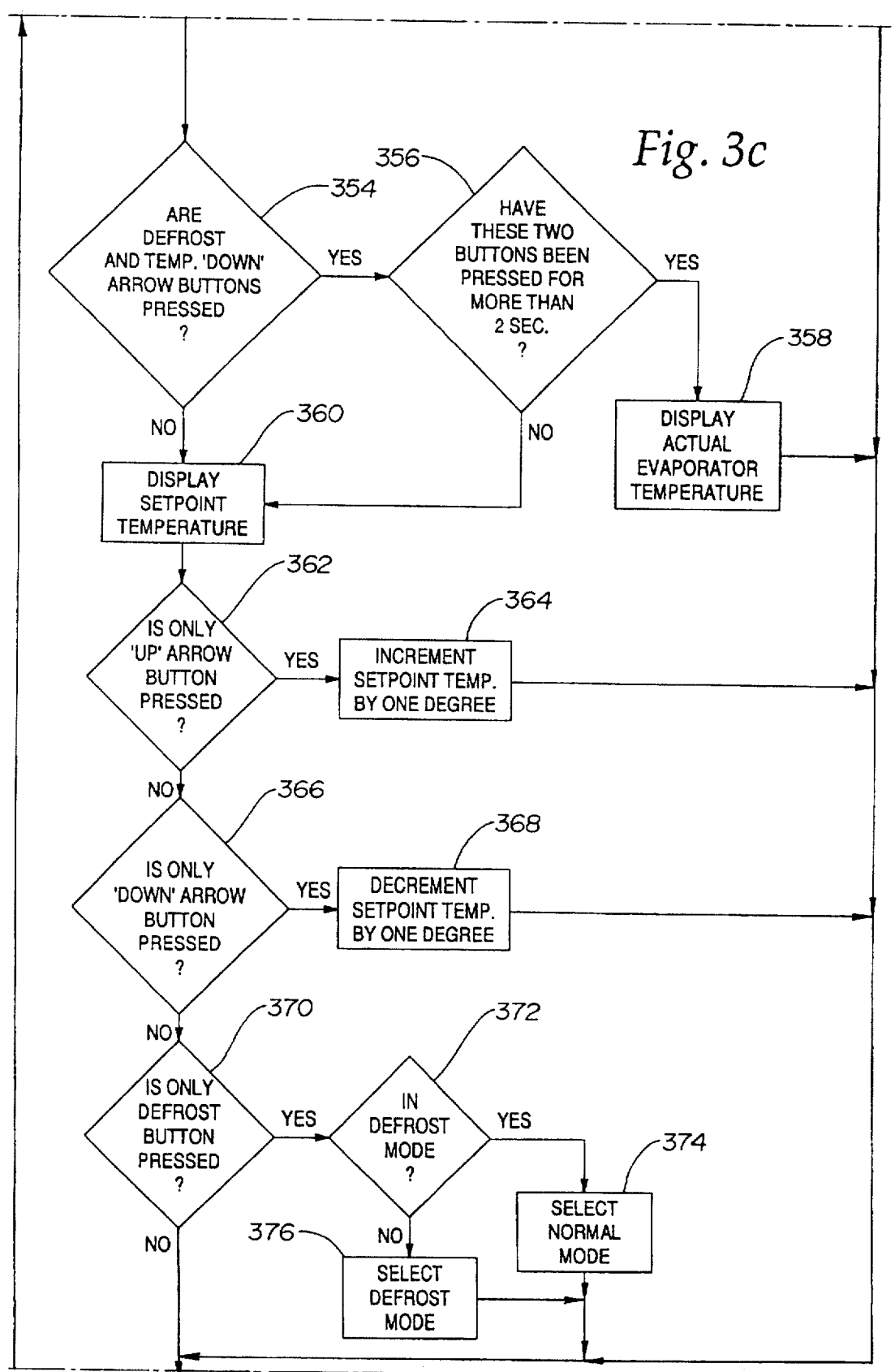
Figure 3D:
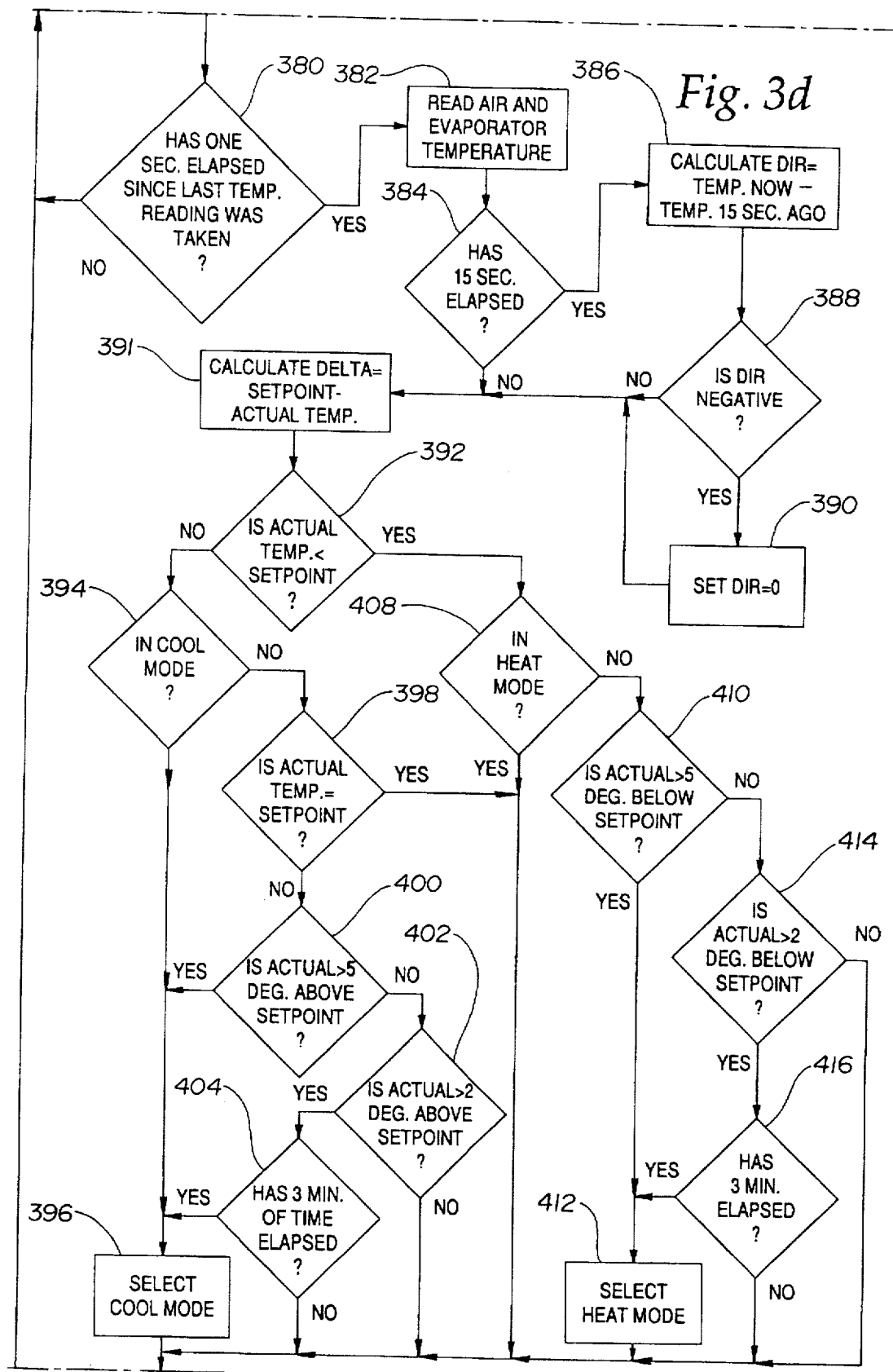
Figure 3E:
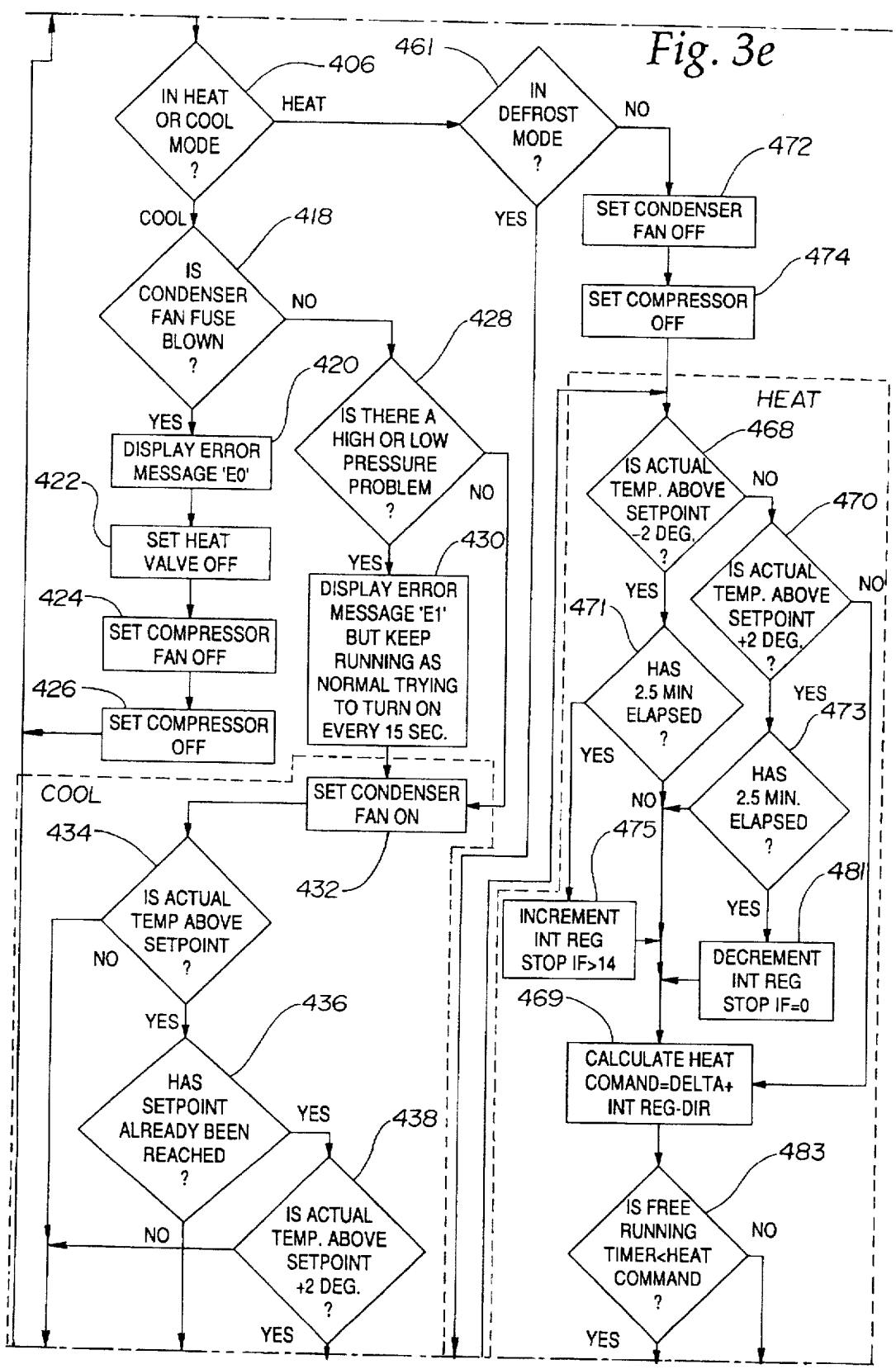
Figure 3F:
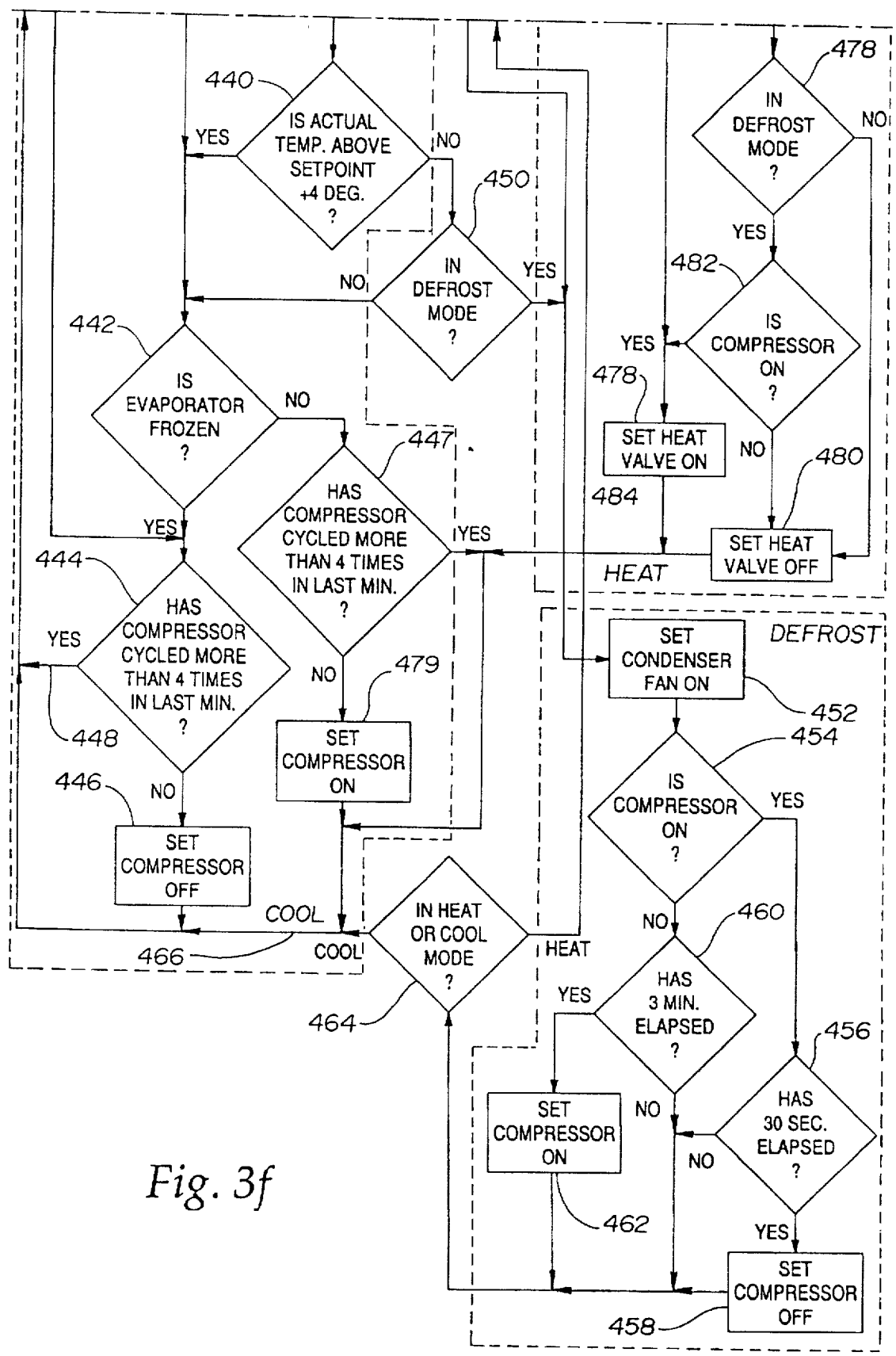
Figure 4:
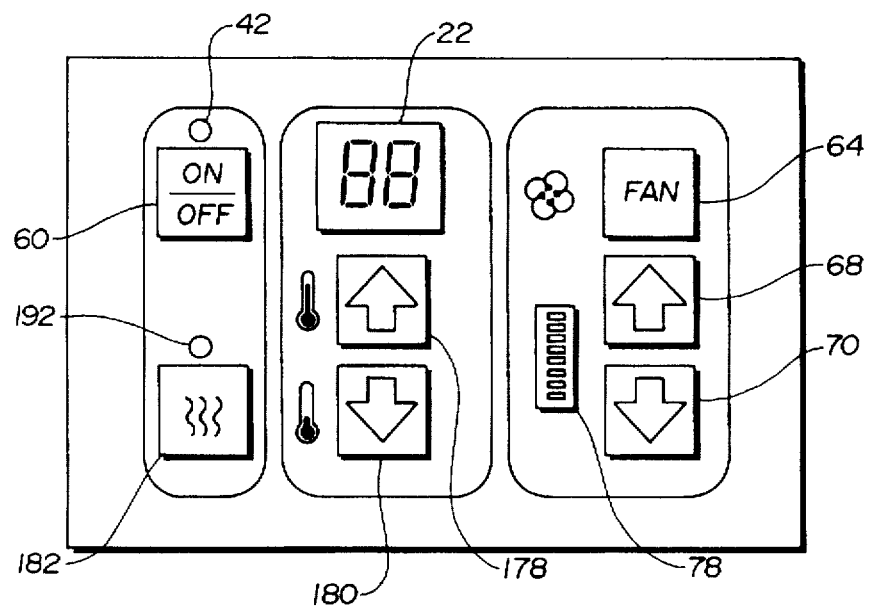
FIG. 4 is a pictorial view of a control panel useful in the practice of the present invention.

Referring now also to FIG. 3c, as a further option, block 354 checks to see whether the DEFROST and temperature DECREASE switches 182, 180 are depressed simultaneously; block 356 looks to see if they have been held depressed for more than two seconds. If so, block 358 will cause display 22 to show the actual evaporator temperature. As indicated in block 360, the default condition is to display setpoint temperature via the temperature display 22.

To change temperature, block 362 looks to see if the up arrow button has been pressed to close switch 178. If so, the setpoint temperature is increased by one degree in block 364. Block 366 checks to see if only the down arrow button has been depressed closing switch 180; if so, block 368 decrements the setpoint temperature by one degree. Block 370 checks to see if the DEFROST button is pressed by itself closing switch 182 and if so block 372 checks to see if the system is in the DEFROST mode of operation. Blocks 374 and 376 will "toggle" the system between "normal" and DEFROST mode on successive depressions of the DEFROST button which activates switch 182.

It is to be understood that microprocessor 40 has a real time clock which may used to determine whether one second has elapsed since the last temperature reading was taken as indicated in block 380. In an alternative embodiment, since this timing step is not critical, a timer may be made by incrementing a register each time a pass is made through the program. Since the time for one pass through the program is known (and branching will not substantially affect it), the value in the register will be proportional to time and is available as a software timer. If not system control is returned to the BEGIN block 300. Once one second has elapsed since the last temperature reading was taken, the system proceeds to read the air and evaporator temperatures in block 382 by obtaining readings from temperature sensors 136 and 148.

In block 384 a fifteen second timer is used to determine whether or not to perform the calculation in block 386 for the rate of change or slope or derivative of air temperature as a function of time. The calculation performed in block 386 is to subtract the air temperature measured fifteen seconds previously from the present air temperature. The resulting number is labeled DIR and is representative of the derivative of the time function of air temperature. In block 388 DIR is tested and set to zero if negative, i.e., if the rate of change of air temperature as a function of time is decreasing. Positive values of DIR are used to prevent overshoot in the temperature regulation portion of the control, described infra. It has been found desirable to maximize the rate of change of cooling and hence negative values of DIR are not used and DIR is set to zero in block 390 when the calculated DIR is negative. Block 391 provides the temperature error signal or "DELTA" by subtracting the actual air temperature from the setpoint or desired temperature. Block 392 determines whether the actual air temperature is less than the setpoint or not. If the actual temperature is equal to or greater than the setpoint, control passes to block 394 to determine whether the system is already in the COOL mode. If so, control passes to block 396. If not, a determination is to whether the actual air temperature is equal to the setpoint is made in block 398. If the actual temperature is more than five degrees above the setpoint as determined in block 400, the system is immediately put or kept in the COOL mode of operation. If the actual air temperature is between two and five degrees above the setpoint as determined by block 402, a timer is checked in block 404 to determine whether three minutes have elapsed. If three minutes have elapsed, the system is put into the COOL mode, if it is not already in that mode by transferring control to block 396. If the system is not in the COOL mode and three minutes have not elapsed, control is bypassed to block 406 to avoid repeatedly switching in and out of the COOL mode with small temperature changes. Blocks 400 and 402 provide a dual deadband function. An absolute deadband is maintained between setpoint temperature and two degrees above setpoint. Temperature variations within this absolute deadband are ignored. Temperature variations in a second deadband between three and five degrees above setpoint must remain so for three minutes in order to cause the system to switch into the COOL mode. It is thus to be understood that the refrigerant cooling loop will be effective for cooling the internal ambient air environment in an off-road vehicle operator space in a COOL mode when the actual air temperature is above the desired air temperature, and that the heating loop will be effective for heating the internal ambient air environment in the operator space in a HEAT mode when the actual air temperature is below the desired air temperature, but that the electronic temperature control circuit will switch between the COOL and HEAT modes only when the temperature variation between actual and desired air temperature is either: i) greater than a first temperature offset (of preferably two degrees) and remains so for longer than a preset time, preferably three minutes, or ii) greater than a second temperature offset (of preferably five degrees).

Returning now to block 392, if the actual temperature is less than the setpoint temperature, control is passed to block 408 where a determination is made as to whether the system is already in the HEAT mode. If so, control passes to block 406. If the actual air temperature is more than five degrees below the setpoint (i.e. less than the setpoint temperature minus five degrees as determined by block 410) system 10 is placed in the HEAT mode of operation in block 412. If the actual air temperature is three, four or five degrees below the setpoint temperature as determined by block 414, and that condition has existed for three minutes as determined in block 416, the system is switched to the HEAT mode operation. If the actual temperature is one or two degrees below the setpoint and the system is not already in the HEAT mode, control is passed to block 406. Thus, a two-degree wide absolute deadband below setpoint is provided by block 414 and a timed-dependent deadband between three and five degrees below setpoint is provided by blocks 410, 414 and 416 to prevent repeated cycling in and out of the HEAT mode of operation for small, relatively short duration temperature fluctuations. In other words, if the system is in either the HEAT or COOL mode and the opposite mode is called for by the relationship of actual and setpoint air temperature values, the system will switch modes for large temperature errors (i.e., greater than five degrees difference between actual air temperature and setpoint), will wait for three minutes to see if a "moderate" temperature error or difference remains (i.e., three to five degrees difference between actual air temperature and setpoint), and finally system 10 will ignore "small" temperature variations (i.e., two degrees above setpoint for cooling and two degrees below setpoint for heating). It has been found that such operation results in satisfactory climate control within the operator space and avoids excessive cycling or switching between the HEAT and COOL modes in response to small temperature fluctuations and transient moderate temperature fluctuations.

Referring now to block 406, a determination is made as to whether the system is in the HEAT or COOL mode. If it is in the COOL mode, the condition of the condenser fan motor fuse is checked in block 418. If the fuse is blown, the temperature display will present error message "E0" as indicated in block 420, the heat valve will be turned OFF in block 422, the condenser fan will be turned OFF in block 424, and the compressor will be turned OFF in block 426. Control will then be returned to the BEGIN block 300. If the condenser fan motor fuse is not blown, a check is made at block 428 to determine whether there is a high or low pressure problem. If there is, the display 22 will present error message "E1" as indicated in block 430, but the compressor will be attempted to be restarted every fifteen seconds. If there is no high or low pressure problem (as determined by block 428), control will pass to block 432 where the system enters the COOL mode.

COOL Mode

In block 432 the condenser fan is turned on. In block 434 the actual air temperature is compared with the setpoint temperature. If the setpoint has already been reached, control passes through block 436 to block 438. A determination is made in block 438 as to whether the actual temperature is greater than two degrees above the setpoint temperature. If so, a further determination is made in block 440 as to whether the actual temperature is more than four degrees above the setpoint. If so, the evaporator temperature will be checked in block 442 to determine whether the evaporator is frozen. If so, block 444 will determine whether the compressor has cycled on and off more than four times in the last minute. If not, the compressor will be turned OFF in block 446. If the compressor has cycled more than four times in the last minute, control will be returned via line 448 to the begin block 300.

Returning to blocks 438 and 440, if the actual temperature is between two and five degrees above the setpoint, a determination will be made in block 450 as to whether the system is in the DEFROST mode.

DEFROST Mode

When system 10 enters the DEFROST mode, control will be transferred to block 452 where the condenser fan will be turned ON. A determination will be made in block 454 as to whether the compressor is ON. If so, it will be allowed to run for thirty seconds as measured by block 456 before being turned OFF in block 458. If block 454 determines that the compressor is off, the system will wait for three minutes as determined by block 460 before turning the compressor ON in block 462. Control will then pass to block 464 where a determination will be made whether the system is in the HEAT or COOL mode of operation. If the system is in the COOL mode, control will be returned via line 466 to the BEGIN block 300. If the system is in the HEAT mode, control will be transferred to block 468.

Returning now to block 406 (at the top of FIG. 3e), if system 10 has enabled the HEAT mode when block 406 is reached, control will be transferred to block 461 where a determination will be made as to whether the system is actually in the DEFROST mode (which requires enablement of the HEAT mode). If it is in DEFROST, control will then be transferred to block 452. If the system 10 is not in the DEFROST mode, the condenser fan will be turned OFF as indicated at block 472 and the compressor will be turned OFF as indicated in block 474.

Returning now again to block 442, while in the COOL mode, if the evaporator is not frozen, a test is performed in block 477 to check to see whether the compressor has been cycled more than four times in the last minute. If not, the compressor is turned ON in block 479. If the compressor has cycled more than four times in the last minute, control is returned to the begin block 300.

HEAT Mode

The system enters the HEAT mode at block 468, either from block 474 or block 464. A determination will be made as to whether the actual temperature is below a temperature two degrees below the setpoint in block 468. If not, a test is performed in block 470 to determine whether the actual temperature is above a temperature two degrees above the setpoint. If the actual temperature is equal to the setpoint or within the ± two degrees of the setpoint, control will pass to block 469 directly where the HEAT COMMAND will be calculated. If the temperature is outside of the ± two degree band around setpoint, a test will be performed in block 471 or 473 to determine whether two and a half minutes have elapsed. The two and a half minute timer is held RESET while the temperature is within the ± two degree deadband around the temperature setpoint. If two and a half minutes have elapsed, the INT REG value is incremented in block 475 or decremented in block 481, depending upon whether the actual air temperature is above or below the setpoint, and the two and a half minute timer is also RESET when INT REG is incremented or decremented. In other words, if the actual air temperature is below a temperature two degrees below the setpoint and two and a half minutes have elapsed, the INT REG is incremented (but only up to a value of fifteen) before calculating the HEAT COMMAND in block 469. Similarly if the actual air temperature is above two degrees above the setpoint and two and a half minutes have elapsed while this condition existed, INT REG is decremented or counted down (but not below zero) before calculating the HEAT COMMAND in block 469. If the actual air temperature moved within the ±2 degree deadband before two and a half minutes elapse, the timer is RESET and INT REG is not changed.

It may thus be seen that the system 10 has an integral control loop including blocks 468–481 which operates outside a ±2 degree deadband and which ignores actual temperature variations within the deadband. It may further be seen that the integral control loop performs a check in (indicated by blocks 471 and 473) to see if the actual temperature has remained outside the deadband for at least two and a half minutes before computing an integral error by incrementing or decrementing the INT REG value in the integral control loop. It has been found preferable to set an upper limit of 15 and a lower limit of 0 for the integral control loop error. These values for the deadband, timing and upper and lower limits have been found to give desirable performance in a particular vehicle application; other values may be chosen, depending upon the particular characteristics of the cooling system capacity, the thermal characteristics of the operator space to be cooled, and the performance desired.

To calculate the HEAT COMMAND in block 469 the present difference between the setpoint and actual air temperature (DELTA) is added to the value of INT REG (the contents of the integral register or integral error) and the value of DIR (the derivative or rate of change of the air temperature) is subtracted.

Once the HEAT COMMAND is calculated, it is compared against a free running timer in block 483. The free running timer of block 483 counts from zero to fifteen at one count per second and resets to zero after counting to fourteen. Block 483 provides a time dependent pulse-width modulation for operating the heat valve. If the free running timer is less than the HEAT COMMAND, the heat valve is turned ON in block 476. Once the free running timer value exceeds the HEAT COMMAND a test is performed in block 478 to determine whether the system is in the DEFROST mode and, if not, the heat valve is turned OFF in block 480. If the system is in the DEFROST mode, and the compressor is ON (as determined by block 482) the heat valve is kept ON in block 476 to provide defrosting. If the compressor is OFF when block 482 is reached, the heat valve is turned OFF in block 480. The HEAT portion of the control is exited at line 484 which returns control to the BEGIN block 300.

The invention is not to be taken as limited to all of the details thereof as modifications and variations thereof may be made without departing from the spirit or scope of the invention.

For example, in another embodiment of this control apparatus, thermistor 148 may be replaced by a conventional capillary tube and a Normally Closed (N.C.) electrical contact for sensing evaporator temperature. In such an alternative, the N.C. contact is preferably connected to provide line 160 with the $V_{DD}$ voltage when closed, indicating a frozen evaporator condition. When the capillary tube embodiment is used, it is to be further understood that resistor 161 may be replaced by a short circuit and capacitor 158 replaced by a 10K pull-down resistor. Potentiometer 144 and resistor 146 may be omitted in this embodiment, and the two decimal digit display 22 will show the diagnostics "OP" for an open contact condition and "CL" for a closed contact condition instead of displaying actual evaporator temperature according to block 358 (see FIG. 3c).

It is further to be understood that the heating loop may make use of heat sources other than the coolant from an internal combustion engine and still be within the scope of this invention. For example, if an air-cooled engine or other prime mover such as (but not limited to) a hydraulic or electric motor were to be used on the vehicle, heat may be supplied to the operator cab by a conventional resistance-type space heater controlled by line 246 which is shown connected to the heat valve coil in FIGS. 1 and 2d. The space heater may be powered by an electrical source on-board the vehicle either directly or through an additional conventional relay (not shown) for increased power handling.

What is claimed is:

1. Apparatus for heating an enclosed operator space in an off-road vehicle comprising:

a) a heating loop having a heat valve for heating an internal ambient air environment in an off-road vehicle operator space;

b) an actual air temperature sensor for providing an electrical signal representative of the actual air temperature of the air heated by the heating loop; and c) an electronic temperature control circuit responsive to a difference between the electrical signal representative of actual air temperature and to a desired air temperature outside a predetermined deadband containing the desired air temperature and having an integral control loop operating outside the predetermined deadband and holding the integral error constant within the predetermined deadband by ignoring actual temperature variations within the predetermined deadband and providing a HEAT COMMAND signal responsive to the integral error; and d) a heat valve control block having a free running timer counting up to a predetermined number, then resetting to zero, and repeating counting, the block controlling the heat valve by comparing the count in the timer to the HEAT COMMAND signal and turning ON the heat valve when the timer count is less than the HEAT COMMAND signal and turning the heat valve OFF when the timer count is greater than the HEAT COMMAND signal.

2. The apparatus of claim 1 wherein the deadband extends two degrees above and two degrees below the desired air temperature.

3. The apparatus of claim 1 wherein the temperature control circuit checks to see if the actual temperature remains outside the deadband for a predetermined time before computing an integral error in the integral control loop.

4. The apparatus of claim 3 wherein the predetermined time is two and a half minutes.

5. The apparatus of claim 3 further comprising a predetermined upper limit above which the integral error is clamped to an upper fixed value.

6. The apparatus of claim 3 further comprising a predetermined lower limit below which the integral error is clamped to a lower fixed value.

\* \* \* \* \*